Feb. 23, 1943.    E. E. MOYER ET AL    2,312,117
CONTROL SYSTEM
Filed April 23, 1942

Inventors:
Elmo E. Moyer,
Orrin W. Livingston,
Henry H. Leigh,
by Harry E. Dunham
Their Attorney.

Patented Feb. 23, 1943

2,312,117

UNITED STATES PATENT OFFICE 2,312,117

CONTROL SYSTEM

Elmo E. Moyer and Orrin W. Livingston, Scotia, and Henry H. Leigh, Schenectady, N. Y., assignors to General Electric Company, a corporation of New York Application April 23, 1942, Serial No. 440,158

16 Claims. (Cl. 172—179)

This invention relates to control systems, more particularly to systems for controlling the operation of electric motors, and it has for an object the provision of a simple, reliable, and improved control system of this character.

More specifically, the invention relates to systems for controlling the starting of an electric motor, and a further object of the invention is to accelerate the motor at the maximum permissible rate to a desired speed which may be preset upon a calibrated speed control device.

Another object of the invention is the provision of a control system in which the current is limited to a predetermined value thereby to accelerate the motor to the preset speed without excessive current peaks.

Another object is to compensate for the internal voltage drop of the armature of the motor during acceleration and normal running operation of the motor.

A further object of the invention is the provision of a wide, stepless range of operating speeds.

A still further object of the invention is the provision of a compact variable speed motor drive supplied from a source of alternating current in which gears, pulleys, clutches, and bulky apparatus heretofore used are eliminated and in which the objects set forth in the foregoing are achieved largely by the use of inexpensive electronic devices.

In carrying the invention into effect in one form thereof, a direct current motor is supplied through a transformer and suitable electric valve apparatus from a source of alternating voltage. In order to preset a desired operating speed for the motor, a movable control device which may be calibrated in terms of speed produces a reference voltage corresponding to a desired operating speed, and a control voltage dependent upon the speed of the motor is derived from the motor. The difference of these two voltages is utilized to control the electric valve apparatus to accelerate the motor to the desired preset operating speed, or to vary the speed of the motor from one value to another as desired. In addition, means responsive to the armature current or to a quantity proportional thereto, superimposes a controlling effect on the electric valve apparatus to limit the current supplied to the armature to a predetermined maximum value thereby to provide for accelerating the motor to a desired speed in a minimum of time and without any current peaks.

For a better and more complete understanding of the invention, reference should now be had to the following specification and to the accompanying drawing, the single figure of which is a simple, diagrammatical representation of an embodiment of the invention.

Figure 1:
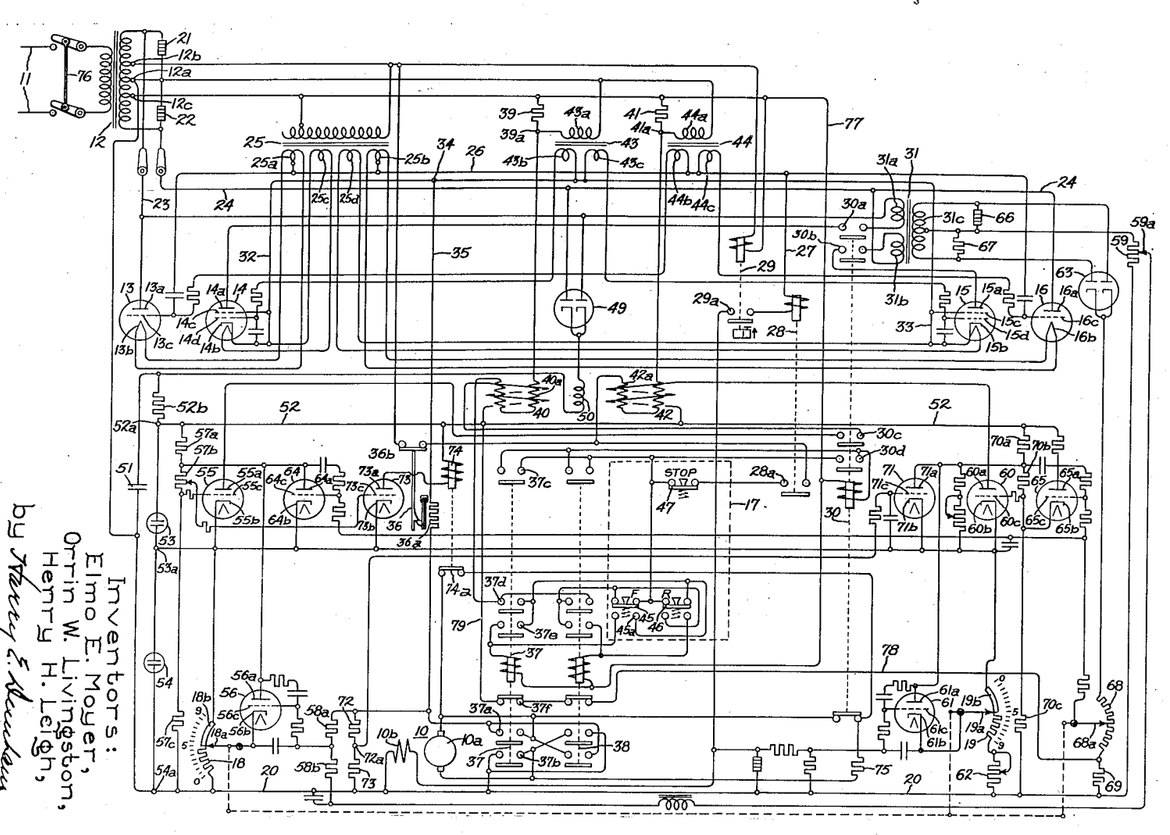

Referring now to the drawing, an electric motor 10 having an armature 10a and a shunt field winding 10b is supplied from a source of alternating voltage 11 through a supply transformer 12 and suitable electric valve apparatus comprising electric valves 13, 14, 15, and 16. The starting, stopping, and reversing of the motor 10 are under the control of a suitable controlling accessory such as a push button station 17 and a pair of feed controlling rheostats 18 and 19. If desired, the speed controlling rheostats 18 and 19 may be mounted on the push button station control panel.

The secondary winding of the supply transformer 12 is provided with a midtap 12a and this midtap is connected to the bus 20 which becomes the negative side of the direct current system, i. e., the negative armature terminal, the negative field terminal, and the negative control terminal. Assuming that the motor 10 is designed for operation on 250 volts, the full secondary voltage of the transformer will be approximately 620 volts. Two 57½-volt taps 12b and 12c either side of center provide a 115-volt tapped source of control power for filaments, transformers, phase shift bridges, and relay excitation.

Suitable non-linear resistance units 21 and 22 are connected across each half of the secondary winding. These non-linear resistances may be made of any suitable material having a non-linear characteristic but are preferably made of a composition of silicon carbide crystals which are held together by a suitable binder. Resistance material of this character is sold on the market under the trade-mark Thyrite and is described and claimed in United States Patent 1,822,742—Karl B. McEachron, dated September 8, 1931. The purpose of these non-linear resistances is to protect the inductive winding from high voltage surges which sometimes occur in tube circuit operations. The non-linear resistance provides a low resistance shunt path to voltages several times higher than normal, and a very high resistance path to normal voltage.

The current supplied to the field winding 10b of the motor from the source 11 is controlled by electric valves 13 and 16. As shown, the anodes 13a and 16a of electric valves 13 and 16 are connected by means of conductors 23 and 24 to opposite terminals of the secondary winding of transformer 12. The filamentary cathodes 13b and 16b are heated by means of current supplied to the cathodes through a filament transformer 25, the primary winding of which is connected to the 115-volt taps 12b and 12c of the supply transformer, and the secondary windings 25a and 25b of which are connected to the filamentary cathodes 13b and 16b, respectively. These secondary windings 25a and 25b of the filament transformer are midtapped, and the midtaps are connected to the conductor 26 which thus becomes the positive terminal of the field supply. Thus, the field circuit may be traced from the positive conductor 26 through a conductor 27, the operating winding of a field protective relay 28, the contacts 29a of a time delay relay 29 through field winding 10b to the negative conductor 20. The supply of current from the source 11 to the armature 10a of the motor is controlled by means of the electric valves 14 and 15. As shown, the electric valves 14 and 15, like the electric valves 13 and 16, are connected for bi-phase rectification, i. e., their anodes 14a and 15a are connected through contacts 30a and 30b of anode contactor 30 and through primary windings 31a and 31b of a special control transformer 31 to the opposite of terminals of the secondary winding of the supply transformer 12. The cathodes 14b and 15b of valves 14 and 15 are provided with suitable heating units which are connected to the secondary windings 25c and 25d of the filament transformer 25. The cathodes 14b and 15b are connected by means of conductors 32 and 33, respectively, to the terminal 34 which thus becomes the positive side of the supply for the armature. Thus the armature circuit is readily traced from the positive terminal 34 through conductor 35, the heating element 36a of an overload protective relay 36, one or the other of the directional contactors 37 and 38, and then through armature 10a to the negative conductor 20. If desired, a smoothing reactor (not shown) may be connected in the positive direct current motor armature lead 35.

Although the electric valves 13, 14, 15, and 16 may be of any suitable type, they are preferably grid controlled, mercury vapor thyratron tubes. The cathodes 14b and 15b of the valves 14 and 15 which control the supply of current to the armature are indirectly heated, and these valves are provided with shield grids 14c and 15c as well as with control grids 14d and 15d, respectively. The valves 13 and 16 which control the supply of current to the field winding have directly heated filamentary cathodes and have only single grids 13c and 16c which are the control grids. In thyratron valves, the function of the control grid is only to initiate the flow of current between the anode and cathode during each positive half-cycle of anode voltage. Once current has started to flow, the grid exercises no further control until the conductivity of the valve has been interrupted by some means external to the valve itself. Once the current has ceased to flow, the potential of the grid will again determine the point in the positive half-cycle of anode voltage at which the valve will again become conducting. These valves are therefore grid controlled arc rectifiers.

The purpose of the time delay relay 29 is to allow time for the initial heating of the cathodes of the electric valves before power is applied to the anode circuits. Since normally open contacts 29a of the time delay relay 29 are included in the energizing circuit of the field protective relay 28, which has normally open contacts 28a in the energizing circuit of the directional contactors, which, in turn, have normally open interlock contacts in the energizing circuit of the anode contactor 30, the anode contactor cannot be closed to apply voltage to the anodes of the electric valves until a predetermined interval after the connection of the supply transformer 12 to the source of alternating voltage 11.

The purpose of the field protective relay 28 is to delay the possibility of the application of voltage to the armature of the motor until a safe field excitation has been established and to interrupt the armature circuit in case of a field failure.

Although the thyratron valves 13, 14, 15 and 16 may be controlled by any suitable method, it is preferred to use the method of phase shift control of the grid voltage. For the carrying out of this method of control, a pair of phase shifting networks, one for the armature thyratrons and one for the field thyratrons, are provided. The phase shifting network for the armature thyratrons comprises a resistor 39 and the alternating current winding 40a of a saturable core type reactor 40, and the network for the field thyratrons comprises a resistor 41 and the alternating current winding 42a of a saturable core type reactor 42. The network for the field thyratrons is connected across the low voltage terminals 12b, 12c through the interlock contacts 36b of the overload relay 36. Similarly, the network for the armature thyratrons is connected across the low voltage terminals 12b and 12c, but this circuit passes through interlocks on the reversing contactors 37 and 38, through contacts of the F, R and Stop push buttons on the push button control panel 17, through the field protective relay contacts 28a, and through the overload relay contacts 36b. The primary winding 43a of a grid transformer 43 is connected between the midtap 12a and the junction point 39a of the resistor 39 and reactor winding 40a. This grid transformer has two secondary windings 43b and 43c. The secondary winding 43b is connected between the cathode and grid of the armature thyratron 14 and similarly, the secondary winding 43c is connected between the cathode and grid of the armature thyratron 15. A corresponding grid transformer 44 is provided for the field thyratrons 13 and 16 which has a primary winding 44a connected between the midtap 12a and the junction point 41a of the resistor 41 and reactance winding 42a, and a pair of secondary windings 44b and 44c which are connected between the cathode and grid of the thyratrons 13 and 16, respectively. The phase shift of the grid voltages is produced by varying the reactance of the saturable core reactors, which is controlled by varying the DC saturation of these reactors.

The control is such that when the saturable reactors are saturated, the voltages of the grid transformers tend to be in phase with the anode transformer voltage, and when the reactors are unsaturated, the voltages of the grid transformers tend to be out of phase and lagging. Intermediate values of saturation produce intermediate phase relationships. Thus, when the saturable reactors 40 and 42 are fully saturated, the thyratrons 13, 14, 15, and 16 are fully conducting and conversely, when the reactors are unsaturated, the thyratrons are non-conducting. For intermediate values of saturation, the thyratrons have corresponding intermediate values of conductivity.

The push button station 17 is provided with a plurality of push button type switches 45, 46, and 47 for controlling the starting, stopping, and the direction of rotation of the motor 10. The push button switch 45 controls the starting of the motor in the forward direction; the push button switch 46 controls the starting of the motor in the reverse direction; and the push button switch 47 controls the stopping of the motor.

To the same anode transformer terminals as those to which the anodes of the thyratrons are connected, there is also connected a small auxiliary rectifier valve 49 which furnishes a separate source of direct voltage from which the control electric valves are energized. The saturating windings of the saturable reactors 40 and 42 obtain their energization from this source of direct voltage. This direct voltage is filtered by means of a smoothing reactor 50 and a capacitor 51. The voltage across the capacitor 51 is impressed on a circuit comprising a resistance 52b in series with two glow tubes 53 and 54. These glow tubes 53 and 54 are gaseous discharge devices which operate in that region of their characteristic in which the voltage drop across the tube is substantially constant over a wide range of current. The voltage across the points 52a and 54a is fixed in magnitude by the type of glow tube used, and within the operating limits of this equipment, this voltage is independent of variations in the alternating current supply voltage. Any difference in voltage between the voltage drop across the capacitor 51 and the constant voltage across glow tubes 53 and 54 is absorbed by the resistor 52b.

The voltage across the glow tubes 53 is used to stabilize the voltage on the amplifier valves which are connected between the points 52a and 53a. The voltage drop across the glow tube 54 is the voltage standard with which signal voltages are compared for controlling purposes.

For the purpose of varying the direct current which flows in the saturating winding 40a, a suitable amplifying electric valve 55 is provided. This valve is provided with an anode 55a, a cathode 55b, and a control grid 55c. It will be noted that the direct current winding of saturable reactor 40 and the valve 55 are connected in series across the tube 53. The control of the current through the direct current winding of the armature saturable reactor 40 is achieved by proper choice of the grid-to-cathode voltage of the valve 55. As the voltage of the grid 55c is made less negative with respect to the voltage of the cathode 55b, the current transmitted by the valve will increase, thereby increasing the saturation of the armature saturable reactor 40 which, as pointed out in the foregoing, results in increasing the voltage applied to the armature of the motor 10. Conversely, as the voltage of the grid 55c is made more negative with respect to the voltage of the cathode 55b, the current transmitted by the valve will decrease and this will decrease the voltage supplied to the armature of the motor. An additional amplifying electric valve 56, which is provided with an anode 56a, a cathode 56b, and a control grid 56c, is provided for the purpose of varying the voltage on the grid 55c so that the speed of the motor 10 is maintained constant at a preset value which is correlated with the position of the slider 18a on the speed controlling potentiometer 18. In other words, the electric valve 56 serves as a connecting link between the armature speed controlling potentiometer 18 and the electric valve 55 which controls the saturation of the armature saturable reactor 40, and hence, controls the armature voltage and speed of the motor 10. The grid 56c of valve 56 is connected to a voltage divider comprising resistors 57a, 57b, and 57c. The electric valve 56 is connected between the slider 18a of the speed control potentiometer 18 and the junction point of the resistors 57a and 57b. When the voltage of the grid 56c is made less negative with respect to its cathode, the current transmitted by the valve 56 is correspondingly increased, and since this current flows through the resistor 57a, the voltage drop across this resistor is correspondingly increased and consequently, the voltage of the grid 55c is correspondingly decreased so that the current transmitted by valve 55 is decreased and the armature voltage and speed are correspondingly decreased. Thus, increasing the conductivity of electric valve 56 has the effect of decreasing the voltage supplied to the armature of motor 10 and conversely, decreasing the current transmitted by electric valve 56 has the effect of increasing the voltage supplied to the armature of motor 10.

Since the lower terminal of resistor 57c and one electrode of tube 54 are connected together at point 54a, and since the upper terminal of resistor 57c is connected to the grid 55c, and the upper electrode of valve 54 is connected to the cathode 55b, the valve 55 compares the voltage drop across the resistor 57c with the voltage drop across the tube 54.

If the armature voltage or a portion of the armature voltage is impressed on the grid 56c, an increase in armature voltage will increase the conductivity of valve 56 thereby decreasing the conductivity of valve 55 and decreasing the output of thyratrons 14 and 15 and thereby correcting the increase in armature voltage. If the armature voltage decreases, the reverse action takes place and the decrease in armature voltage is corrected. The position of the slider 18a on the armature speed control potentiometer determines the percentage of the total voltage drop across the valve 54 which is to be derived and used as a preset indication of speed. The voltage that is so derived and used as a reference voltage is the voltage between the slider and the negative bus 20. Since the cathode of the valve 56 is connected to the slider, then the position of the slider will determine the voltage of the cathode relative to the negative bus 20. A signal voltage is derived from the armature voltage by means of a voltage divider which comprises resistors 58a, 58b and that portion of the resistor 59 between the slider 59a and the negative bus 20. The signal voltage used is the voltage from the junction point of the resistors 58a and 58b to the negative bus 20, and this signal voltage is impressed on the grid 56c of valve 56. Thus the grid-to-cathode voltage of the valve 56 is the difference between the signal voltage and the voltage from the slider 18a to the negative bus 20. The tendency of the circuit will be to maintain the signal voltage approximately equal to the reference voltage, i. e., the voltage from the slider 18a to the negative bus 20. Hence, the armature voltage and the speed of the motor will be approximately proportional to the reference voltage tapped off by the slider 18a of the speed control potentiometer.

The voltage selected by the position of the slider 18a is a position of the constant voltage drop across the glow tube 54 and is therefore constant. As the slider is moved from position 0 to position 5, the preselected speed levels are progressively increased. When the slider is at point 5, the maximum voltage can be impressed on the armature of the motor.

For the purpose of varying the saturating current of the field saturable reactor 42, a pair of electric valves 60 and 61 corresponding, respectively, in function to the valves 55 and 56 of the armature control, is provided. The electric valve 60 has an anode 60a, a cathode 60b, and a control grid 60c, and similarly the valve 61 has an anode 61a, a cathode 61b, and a control grid 61c. In the control of the field current, the voltage across the field winding 10b is assumed to be an indication of field current, i. e., it is assumed to be proportional to field current. The connections and operation of the valves 60 and 61 are similar to the connections and operation of the valves 55 and 56 of the armature control. The electric valves 60 and 61 operate to compare the voltage across the field winding 10b, or a selectable portion thereof, with a reference voltage which is derived from the voltage of glow tube 54 by means of the slider position on the field weakening potentiometer 19 which is connected in series with a potentiometer 62 across the glow tube 54. The difference between the signal voltage derived from the field winding and the reference voltage derived from the tube 54 is impressed on the grid-cathode circuit of the valve 61 in such a manner that if the field voltage increases, the conductivity of the valve 61 increases, thereby decreasing the conductivity of the valve 60 and the saturation of the field saturable reactor 42 thereby to decrease the voltage supplied to the field winding. Conversely, a decrease in the voltage across the field winding will have the effect of decreasing the conductivity of the electric valve 61, thereby increasing the conductivity of the valve 60 and increasing the field voltage.

The purpose of the adjustable resistor 62 which is connected between the negative terminal of the field weakening potentiometer 19 and the negative bus 20 is to prevent the reduction of the field voltage to zero when the slider 19a of the field weakening potentiometer is at the maximum speed position, and to insure that it will be reduced to a preselected minimum value corresponding to the field weakening range of the motor with which the equipment is to be used.

If it should be desirable to use field current rather than field voltage as the signal voltage, this may be done by substituting a voltage proportional to current for that portion of the field voltage which is impressed on the grid circuit of the electric valve 61.

The armature speed control potentiometer 18 and the field weakening control potentiometer 19 are preferably combined on a common shaft with the resistance portions 18 and 19 arranged circumferentially and with the sliders so oriented that with the speed control knob in the zero position, which may be assumed to be the full counterclockwise position, the sliders 18a and 18b will also be in the zero position. Thus when the speed control knob is turned in a clockwise direction from the zero position, the slider 18a of the armature voltage potentiometer taps off an increasing portion of the reference voltage of valve 54, but the slider 19a of the field weakening potentiometer slides along the contact strip 19b and therefore taps off the full voltage of tube 54 which corresponds to a condition of full field excitation. However, when the control knob passes position 5, the slider of the armature speed control potentiometer slides on the contact strip 18b so that it taps off the full voltage of tube 54 corresponding to full armature excitation, but the slider 19a of the field weakening potentiometer begins to tap off decreasing portions of the voltage across the tube 54 so that the field will be progressively weakened as the control knob is moved in a clockwise direction. In the extreme clockwise position, which is point 9 on the dial, the armature thyratrons 14 and 15 are supplying rated voltage to the armature and the field thyratrons 13 and 16 are supplying the minimum voltage to the field winding 10a. Therefore, the motor will be rotating at maximum speed.

For the purpose of limiting the armature current to a maximum permissible value, means are provided for comparing a signal voltage derived from the anode current of the armature thyratrons with a reference voltage and utilizing the difference of these signal and reference voltages to control both the armature and field thyratrons in such a manner as to limit the armature current to the desired value. These means are illustrated as comprising the anode current transformer 31, the bi-phase rectifying electric valve 63, and control amplifier valves 64 and 65. As shown, the two primary windings 31a and 31b of the anode current transformer 31 are connected in series with the anode circuits of each of the armature thyratron valves and this transformer is polarized in such a manner that when one of the armature thyratrons conducts, the flux in the core is in one direction and when the other thyratron conducts, the flux is reversed. As a result, an alternating current voltage is induced across the secondary winding 31c and the magnitude of this induced voltage will be determined by the resistance load connected to the secondary and by the turn ratio between primary and secondary windings. A non-linear resistance 66 which is similar to the non-linear resistances 21 and 22 is connected across a portion of the secondary winding to absorb the voltage surges which are induced in the secondary winding when the load current changes abruptly. A resistor 67 which is connected across another portion of the secondary winding determines the magnitude of the alternating current voltage that will be developed for a given direct current in the armature circuit. This alternating current voltage is rectified by the electric valve 63 and appears as a direct voltage across a voltage divider comprising resistors 68, 69 and 59.

The electric valves 64 and 65 are provided with anodes 64a and 65a, cathodes 64b and 65b, and grids 64c and 65c, respectively. The anode 64a of valve 64 is connected to the junction point between the sections 57a and 57b of the voltage divider to which the grid 55c of valve 55 is connected, and the cathode 64b of valve 64 is connected to the point 53a to which the cathode 55b of valve 55 is connected. The anode 65a of valve 65 is connected to the conductor 52 and the cathode 65b is connected to the grid 60c of the field control valve 60 which, as shown, is connected to the junction point between the resistance sections 70b and 70c of a voltage divider comprising resistances 70a, 70b and 70c connected across the direct current control system busses 52 and 20. The ratio of the resistance sections of this voltage divider is such that the voltage of the cathode 65b is slightly more negative than the voltage of cathode 64b.

When small amounts of current flow in the armature circuit, the voltage developed across the secondary of the current transformer and the voltage rectified by the valve 63 will be so small that the portion which is utilized as a signal voltage, i. e., the voltage between the slider 68a and the negative bus 20, will be substantially less than the voltage across the tube 54, and consequently, the grids of the valves 64 and 65 will be very much negative with respect to their cathodes which are connected to the conductor 53a and to the junction point between resistance sections 70b and 70c, respectively. An increase of armature current will cause the voltage across the secondary of the current transformer to increase, and the voltage rectified by the valve 63 will increase correspondingly so that the voltage between the slider 68a and the negative bus 20 will ultimately reach a value approximately equal to the voltage across the valve 54 and the negative grid voltage of valves 64 and 65 will be reduced to the value at which these valves begin to conduct current.

When valve 64 conducts current, it has the same effect as if valve 56 were conducting current, which is to decrease the current conducted by valve 55 and thereby decrease the saturation of the armature saturable reactor 40 and decrease the voltage supplied to the armature.

The operation of valve 65 is slightly different in that its cathode is connected to the grid of valve 60 instead of to the cathode, and its anode is connected through a resistor to the positive bus 52. When the grid of valve 65 is made sufficiently less negative to cause current to flow in the anode circuit, the effect of current flow through valve 65 is to raise the voltage of the junction point of resistors 70b and 70c to which the grid 60c of valve 60 is connected. This has the effect of increasing the conductivity of valve 60 with the result that the field of the motor 10 will be strengthened if it has been in a field weakened condition. Since the cathode 65b of valve 65 is more negative than the cathode 64b of valve 64, the valve 60 will be controlled slightly ahead of valve 55, with the result that the field will be strengthened before the armature voltage is decreased.

In a typical installation, the current limit control may be set, by adjustment of the slider 68a, for 150 per cent normal full load current. In this case, the current limit control will be inactive up to approximately 150 per cent full load current because that portion of the direct current voltage proportional to armature current between the slider 68a and the negative bus 20 is less than the voltage drop across the valve 54 with which it is being compared. Therefore, the grids of valves 64 and 65 will be very much negative with respect to their cathodes and these valves will be cut off. To allow for a range of adjustment, the resistor 68 is made in the form of a potentiometer and the circuit in which it is included is so designed that with the slider at the junction point between resistors 68 and 69, maximum voltage must be produced across the secondary of the current transformer 31 before the voltage between the slider 68a and the negative bus 20 will be sufficiently near equality with the voltage drop across the valve 54 to effect control of the valves 64 and 65. With the slider 68a at the opposite end of the resistor, only the minimum value of voltage need be developed across the secondary of the current transformer to control the valves 64 and 65.

For the purpose of accurately maintaining the speed of the motor at the level which is preset upon the speed controlling potentiometer 18, 19, means are provided for compensating for the RI drop in the armature circuit. In effect, these means subtract an increment of voltage from the armature terminal voltage so that the resultant voltage which is used as a signal of speed is approximately equal to the countervoltage of the motor. That is to say, to hold constant armature countervoltage is to hold constant speed and this is possible when the armature terminal voltage is increased by an amount equal to the RI drop of the armature circuit.

The potentiometer 59 serves to subtract the increment of voltage from the terminal voltage of the motor. The slider 59a of this potentiometer is connected to the negative end of the armature voltage dividing resistance network resistors 58a and 58b. The voltage across resistor 59 is proportional to the armature current. The end of resistor 59 which is connected to the negative bus 20 is positive, and the end connected to the midtap of the secondary winding 31c of the current transformer is negative so that the slider is always negative with respect to the negative bus 20, and this negative voltage is added at the lower end of resistor 58b. The circuit functions in such a manner that as the armature current increases, the voltage of the lower end of resistor 58b is made more negative with respect to the negative bus 20, thus tending to make the junction point between resistors 58a and 58b negative with respect to the voltage of the slider 18a. This has the effect of decreasing the conductivity of the valve 56 and thereby increasing the armature voltage.

This voltage must increase to such an extent that the voltage of the grid 56c of valve 56 is raised to the level at which it operated before the lower terminal of the resistor 58b was made negative by the voltage drop between the negative bus 20 and the slider 59a. Thus, an increase of current through potentiometer 59 has a tendency to make the grid 56c negative, and that tendency causes an increased armature voltage to re-establish the voltage of the grid at its former level. Since the voltage drop across the resistance 59 is proportional to armature current and since the RI drop is also proportional to armature current, it is possible by adjustment of the slider 59a to select the voltage drop which will cause the armature terminal voltage to be increased by an amount equal to the internal RI drop of the motor plus the RI drop of all connecting leads.

When a motor is operated at rated armature voltage and at maximum rated field current and is carrying rated full load, it is said to be operating at base speed. If the motor 10 is being operated in the field weakened range, e. g. three times base speed, and if then the speed controlling potentiometer 18, 19 is suddenly changed to a position of lower speed, e. g., one-half base speed, the control would function to decrease the voltage supplied by the armature thyratrons 14 and 15 and to increase the voltage supplied to the field winding by the field thyratrons 13 and 16, as a result of the action of electric valves 55 and 56 and 69 and 61. With the motor running at three times base speed and full field applied as quickly as the time constant of the magnetic circuit will permit, the tendency is for the armature countervoltage to increase to a value which is approximately three times full terminal voltage, i. e., 750 volts in the case of a 250-volt motor. To prevent such an undesirable increase in the armature voltage, an additional electric valve 71 is provided. This valve is provided with an anode 71a, a cathode 71b, and a grid 71c. The anode 71a of this valve is connected to the junction point of the resistors 70a and 70b of the voltage divider to which the grid 60c of valve 60 is connected, and the cathode 71b of valve 71 is connected to the conductor 53a. The grid 71c of valve 71 is connected to the junction point 72a of two resistors 72 and 73 which constitute a voltage divider connected across the armature of motor 10. As thus connected, this valve 71 measures a fixed portion of the armature voltage, i. e., the portion between the junction point 72a and the negative bus 20, and when this portion exceeds the voltage drop across the reference voltage valve 54, the valve 71 becomes conducting, thereby increasing the voltage drop across the resistor 70a and decreasing the voltage of the grid 60c of valve 60 to prevent the saturation of the saturable reactor 42 which controls the field thyratrons 13 and 16. The action of valve 71 upon valve 60 is very similar to the action of valve 61 except that the valve 71 receives its voltage signal from the armature circuit, whereas the valve 61 receives its voltage signal from the field circuit. Thus, valve 71 acts as a cross connection between the armature circuit and the field circuit to prevent the field thyratrons 13 and 16 from increasing the field strength to a point at which the armature voltage would exceed a safe limiting value. In practice, this limit of armature voltage would be set at some value between 300 and 350 volts for a motor whose operating voltage is 250 volts. At voltages below the voltage limit setting the grid of valve 71 is rendered inactive because its grid voltage is very much negative owing to the fact that the voltage between the junction point 72a and the negative bus 20 is very much less than the voltage drop across the reference voltage valve 54.

Owing to the loss of cooling by lack of windage, a motor cannot conduct the same armature current at the very low speeds which are obtained by reduced armature voltage that it can conduct at the higher speed ranges for which it is designed. To this end, the speed control potentiometer 18, 19 may be mechanically coupled to the current limit control potentiometer 68 so that as the sped control potentiometer 18, 19 is turned toward the lower speed position, the current limit setting its correspondingly reduced. This prevents the possibility of overloading the motor excessively at very low speeds.

In order to prevent the motor coasting for a long time at high speed when the speed controlling potentiometer is moved from a high speed position to a low speed position, means are provided for dynamically braking the motor from the higher speed lever to the lower speed level. These means are illustrated as comprising an electric valve 73 and a contactor 74 controlled thereby for completing a dynamic braking circuit through the resistor 75 in parallel with the armature. The electric valve 73 is provided with an anode 73a, a cathode 73b, and a control grid 73c. The anode-cathode circuit extends from the positive direct current control bus 52 through the operating coil of the contactor 74 to the anode 73a and from the cathode 73b to the conductor 53a. The grid 73c of valve 73 is connected to an intermediate point on the resistor 57b which constitutes one element of the voltage divider comprising the resistors 57a, 57b, and 57c to which the grid 55c of electric valve 55 is connected.

With the foregoing understanding of the elements and their organization in the completed system, the operation of the system itself will readily be understood from the following detailed description:

To place the system in condition for operation, the switch 76 is closed to connect the primary winding of the supply transformer 12 to the supply source 11. As a result, the operating coil of the time delay relay 29 is energized and after an interval of time which is determined by the setting of the time delay device and which is sufficient to provide for initial heating of the cathodes of the electric valves, the time delay relay 29 closes its normally open contacts 29a to complete the field circuit from the cathodes of the field thyratrons 13 and 16 through the operating coil of field protective relay 28 and the field winding 10b to the negative bus 20.

Assuming that it is desired to operate the motor at a speed above base speed within the field weakened range, the knob of the speed controlling potentiometer is moved until the sliders 18a and 19a are at a position between 5 and 9 which corresponds to the desired operating speed. As a result, the field thyratrons 13 and 16 will supply a current to the field winding 10b of the proper value for operation of the motor at the preselected speed. Since the operating coil of relay 28 is energized by this field current, relay 28 has picked up and closed its normally open contacts 28a.

To start the motor in the forward direction, the forward push button switch 45 is depressed to bridge its normally open contacts 45a thereby to complete an energizing circuit for the operating coil of the forward contactor 37. This circuit is traced from the low voltage tap 12c through conductor 77, operating coil of contactor 37, contacts 45a of the forward push button switch, normally closed contacts of the reverse push button switch, normally closed contacts of the stop push button switch 47, contacts 28a of the field protective relay, contacts 36b of the overload relay to the opposite low voltage tap 12b. In response to energization, the forward contactor 37 closes its main contacts 37a and 37b and its interlock contacts 37c, 37d, and 37e and opens its normally closed contact 37f. Main contacts 37a and 37b in closing complete the armature circuit from the cathodes of the armature thyratrons by conductors 32 and 33 to the terminal 34 and through conductor 35 and the coil 36a of the overload relay, main contacts 37a, armature 10a, and main contacts 37b to the negative bus 20. Since the slider 18a is on the maximum voltage position, the valve 55, if its anode-cathode circuit were complete at this point in the operation, would be fully conducting and the armature thyratrons 14 and 15 would tend to supply maximum voltage. However, the anode circuit of valve 55 is open at the contacts 30c of the anode contactor 30. Consequently, the phase of the grid voltage of the armature thyratrons is fully retarded so that when the contacts 30a and 30b of the anode contactor are subsequently closed, the output of the armature thyratrons starts from a minimum value. If the anode circuit of the valve 55 were completed and the grid voltage of the armature thyratrons fully advanced when the contacts of the anode contactors 30a and 30b were closed, the armature current for the first few cycles might be undesirably high until sufficient voltage had been built up through the current transformer circuit to initiate the operation of the current limiting feature of the control.

The closing of contacts 37d of the forward contactor completes the circuit for the alternating current winding of saturable reactor 40 from the low voltage tap 12c through the resistor 39, alternating current winding 40a, contacts 37d, normally closed contacts of the reverse push button 46, normally closed contacts of stop button 47, and contacts 28a and 36b to the opposite low voltage tap 12b. Contacts 37c in closing complete the energizing circuit for the operating coil of anode contactor 30 from conductor 77 which is connected to the low voltage tap 12c, through the operating coil of contactor 30 and contacts 37c and thence, by the circuit previously traced through the contacts of the stop push button to the opposite low voltage tap 12b.

In response to energization, the anode contactor 30 closes its normally open contacts 30a, 30b, 30c, and 30d. The contacts 30a and 30b in closing complete the anode circuits of the armature thyratrons 14 and 15, and contacts 30c in closing complete the direct current saturating circuit of the armature saturable reactor 40 through the valve 55, and thus armature current is allowed to build up at a time rate determined by the inductance of the direct current winding of the armature saturable reactor.

Prior to the opening of the normally closed contact 37f of the forward contactor, the junction point between the resistors 68 and 69 is connected by means of conductor 78, contact 37f, and conductor 79 to the positive control voltage bus 52. As a result, a positive voltage is applied to the grids 64c and 65c of the armature current limiting control valves 64 and 65 so that the circuit is given the impression of operating under conditions of excessive armature current, and the control valves 64 and 65 tend to desaturate the armature saturable reactor 40 and to saturate the field saturable reactor 42. When the forward contactor closes its main contacts and opens contact 37f, this false signal circuit is interrupted and after the anode contactor contacts 30a and 30b have closed as a result of the closing of the forward contactor, the armature current is allowed to build up at a rate determined by the inductance of the direct current winding of the armature saturable reactor. If desired, either the false signal circuit 78, 79 or the interlock contact 30c on the anode contactor can be omitted.

Contacts 37e of the forward contactor in closing complete a holding circuit in parallel with the contacts 45a of the forward push button which may now be released.

As a result of the completion of the armature circuit, the motor begins to accelerate to a speed determined by the setting of the speed control potentiometer. During acceleration, before the armature countervoltage has built up to a value corresponding to the preset speed which it is desired to maintain, the phase of the grid voltage of the armature thyratrons tends to be fully advanced and hence, the armature thyratrons tend to supply a current to the armature which is many times full load value. However, the current limiting control acting through valves 64 and 65 decreases the output of the armature thyratrons to the value determined by the setting of the slider of the current limiting potentiometer 68. If during acceleration, the field control has been set for a speed in the field weakening range, as assumed, then the current limit control acting through valve 65 will tend to maintain full field until the armature current tends to fall below the preset limiting value. Thus, during acceleration to a preset speed within the field weakening range, the armature voltage is first allowed to build up at a rate determined by the load on the motor and by the value of the armature current which has been set upon the current limiting potentiometer 68 until full armature voltage is reached. At this point, there is a tendency for the armature current to tend to decrease. However, this tendency will make the grid voltage of the valve 65 more negative thereby decreasing the conductivity of the valve and making the voltage of the grid 60c of valve 60 more negative with the result that the field thyratrons 13 and 16 will supply less current to the field. This results in maintaining the armature current constant until that preset field weakened speed is reached at which point the armature current will drop to that value which is necessary to drive the load. Since the system operates to maintain the maximum permissible value of armature current during the acceleration, the load is accelerated to the preselected speed in the minimum possible time consistent with the armature current limit at which the control is set to operate.

If, while the motor is operating at the preselected high speed assumed, it should be desired to reduce the speed to a substantially lower value, the speed controlling potentiometer is moved to a lower speed position. Assuming that the new speed is less than the base speed of the motor, the control will operate to strengthen the field of the motor and to decrease the voltage supplied to the armature. With some types of load, the motor would tend to coast for some time at the higher speed after which the speed would gradually be reduced to the new preset value. Such a delay in changing from a higher speed level to a lower speed level is frequently undesirable, and in the present control this delay is eliminated by means of the dynamic braking circuit which is under the control of the electric valve 73. This circuit functions in the following manner: When the electric valve 55 is conducting and controlling the current through the armature saturable reactor 40, the grid of valve 73 is more positive than the grid of valve 55 owing to the bias adjustment shown in the drawing. Consequently, the grid of valve 73 will be sufficiently positive to cause valve 73 to conduct sufficient current through the operating winding of dynamic braking contactor 74 to maintain the contact 74a open. When the speed controlling rheostat 18, 19 is adjusted for a lower speed, the grid of valve 55 is made more negative and the grid of valve 73 becomes sufficiently negative to reduce the current through valve 73 to the value at which the dynamic braking contactor 74 drops out and closes its contact 74a to complete a dynamic braking circuit for the armature 10a through the dynamic braking resistor 75. As a result, a large braking torque is developed and the speed of the motor is rapidly reduced to the new value. As the speed of the motor reaches the new value, the grid voltage of valve 55 is reduced to a value corresponding to the new setting of slider 18a with the result that valve 55 conducts less current so that the grid voltages of valves 55 and 73 increase. The increase in the grid voltage of valve 73 increases the current conducted by the valve 73 to the value at which contactor 74 picks up and opens its contacts 74a to interrupt the dynamic braking circuit for the armature.

To stop the motor, the stop push button 47 is depressed to open its normally closed contacts. The opening of the contacts of stop push button 47 interrupts the circuit of the alternating current winding of the armature saturable reactor 40 which was previously traced through the contacts of the stop push button. As a result, the phase of the grid voltage of the armature thyratrons 14 and 15 is retarded, thereby rendering the armature thyratrons 14 and 15 non-conducting so that when the main contacts of the forward contactor 37 and the contacts 30a and 30b of the anode contactor subsequently open as a result of the deenergization of their operating coils, the contacts of the directional contactor and anode contactor will not be required to interrupt any current. As a result, the construction of the directional contactors and the anode contactor can be much lighter than would otherwise be required. In fact, the directional contactors and anode contactor may be of a very light relay construction. The anode contactor in dropping out closes its normally closed contacts 30e to complete a dynamic braking circuit through the dynamic braking resistor 75 in parallel with the armature. As a result, a dynamic braking torque is developed which rapidly brakes the motor to rest.

It will be noted that the circuits of the alternating current windings 40a and 42a of both the armature and field saturable reactors 40 and 42 pass through the contacts 36b of the overload protective relay 36. Consequently, if while the motor is operating, the overload relay 36 should open its contacts owing to an overload, the alternating current circuits of both reactors would be interrupted with the result that the phase of the grid voltages of both the field thyratrons 13 and 16 and the armature thyratrons 14 and 15 would be retarded and the armature and field currents reduced substantially to zero.

Since the energizing circuits for the operating coils of the directional contactors and the anode contactor also pass through the contacts 36b of the overload relay, the opening of contacts 36b also effects dropout of the directional contactors and anode contactor.

Although in accordance with the provisions of the patent statutes this invention is described as embodied in concrete form and the principle thereof has been described together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States is:

1. A motor starter comprising in combination, electric valve means for supplying a voltage to said motor, means for presetting an operating speed for said motor comprising means for producing a reference voltage corresponding to the desired speed, means for producing a voltage proportional to the speed of said motor, means for rendering said electric valve means conducting, an auxiliary electric valve responsive to the difference of said reference voltage and said voltage proportional to speed for controlling said electric valve means to increase the voltage supplied to said motor to accelerate said motor to said desired preset speed, and means responsive to the armature current of said motor for controlling said electric valve means to limit the armature current of said motor to a predetermined value.

2. A motor starter comprising in combination, means for presetting an operating speed for the motor comprising a source of substantially constant voltage and means for deriving a voltage therefrom corresponding to a desired operating speed, means for deriving a voltage from the armature of said motor corresponding to the speed of said motor, an electric valve having an anode, a cathode, and a control grid, connections for applying one of said derived voltages to said grid and the other to said cathode to vary the condition of conductivity of said valve responsively to the difference between the speed of said motor and said preset speed, and electric valve means responsive to the condition of conductivity of said valve for supplying a voltage to said motor to accelerate said motor to said preset speed, and means responsive to the armature current of said motor for controlling said electric valve means to limit the armature current of said motor to a predetermined value.

3. A motor starter comprising in combination, a source of alternating voltage, means for controlling the supply of current to the motor comprising an electric valve provided with an anode, a cathode, and a control grid and having its anode connected to said source and having its cathode connected through said motor to said source, means for varying the conductivity of said valve to accelerate said motor, a transformer having its primary winding included in the connection between said source and said anode, means for rectifying the secondary voltage of said transformer, and means responsive to said rectified voltage for controlling said electric valve to limit the armature current of said motor to a predetermined value.

4. A motor starter comprising a source of alternating voltage, a transformer having a primary winding connected to said source and a secondary winding provided with a midtap, means for controlling the supply of current to a motor comprising electric valve means having a pair of anodes, a cathode and a control grid, connections from the terminals of said secondary winding to said anodes and connections from said cathode and midtap to a motor, means for controlling the voltage of said grid to accelerate said motor, a control transformer having a pair of primary windings connected respectively in said connections to said anodes, a full wave rectifier for rectifying the secondary voltage of said control transformer, and means responsive to said rectified voltage for controlling said electric valve to limit the armature current of the motor to a predetermined value.

5. In combination, an electric motor having an armature and a field winding, a first electric valve means for supplying a voltage to said armature, a second electric valve means for supplying current to said field winding, means for presetting an operating speed for said motor comprising a control member for said valve means movable through a range of positions to control said first valve means to increase the voltage supplied to said armature and movable through a succeeding range of positions to control said second valve means to weaken the current supplied to said field winding, and means responsive to armature current for controlling said first valve means to limit the current supplied to said armature to a predetermined value and for preventing said second valve means from weakening said field current until said armature current tends to decrease below said predetermined value.

6. In combination, an electric motor having an armature and a field winding, a first electric valve means for supplying a voltage to said armature, a second electric valve means for supplying current to said field winding, means for presetting an operating speed for said motor comprising a control member movable through a range of positions to prepare said first electric valve means for increasing the current supplied to said armature and movable through a succeeding range of positions to prepare said second valve means to weaken the current supplied to said field winding, a starting control device, means responsive to operation of said device for rendering said valve means conducting, and means responsive to the current supplied to said armature for controlling said first valve means to limit the current supplied to said armature to a predetermined value, and for controlling said second valve means to weaken the current supplied to said field winding to maintain said armature current at said predetermined value until the speed of said motor increases to said predetermined value.

7. A starter for a motor having an armature and a field winding comprising in combination, means for presetting an operating speed for said motor comprising means for producing a first reference voltage corresponding to the terminal voltage of said motor at said operating speed, means for deriving from said motor a voltage dependent upon the speed of said motor, means for responding to the difference of said voltages for increasing the supply of voltage to the armature of said motor, means for producing a second reference voltage corresponding to the voltage across said field winding at said operating speed, means for deriving a voltage from said field winding dependent upon the voltage across said winding, and means for responding to the difference of said second reference voltage and said voltage derived from said field winding for weakening the current supplied to said field winding.

8. A starter for a motor having an armature and a field winding comprising in combination, means for presetting an operating speed for the motor comprising means for producing a signal voltage corresponding to the terminal voltage of said motor at said operating speed, means for producing a reference voltage corresponding to the voltage across said field winding at said speed, means for deriving voltages from said motor and field winding, auxiliary electric valve means controlled by said reference voltages and derived voltages, and electric valve means controlled by said auxiliary electric valve means for supplying current to said armature and field winding.

9. A starter for an electric motor having an armature and a field winding comprising electric valve means for supplying current to the armature and field winding of said motor, means for presetting an operating speed for the motor comprising a control member movable through a range of positions to prepare said valve means for increasing the voltage supplied to said armature and decreasing the current supplied to said field winding, a start control device and means responsive to operation thereof for rendering said valve means conducting, and means responsive to the armature current of said motor for controlling the order of occurrence of said armature voltage increasing and field current weakening operations.

10. A starter for an electric motor having an armature and a field winding, a first electric valve means for supplying current to said armature and field winding, means for presetting an operating speed for the motor comprising means for producing a first reference voltage corresponding to the terminal voltage of said motor at said operating speed, means for deriving a voltage from said motor dependent upon the terminal voltage of said motor, an auxiliary electric valve having its conductivity controlled by the difference of said voltages, means for producing a second reference voltage corresponding to the field strength of said motor at said speed, means for deriving a voltage from the voltage across said field winding, a second auxiliary electric valve having its conductivity controlled by the difference of said second reference voltage and the voltage derived from said field winding, means responsive to the condition of conductivity of said auxiliary valves for controlling said electric valve means to increase the voltage supplied to said armature and weaken the current supplied to said field, additional electric valve means provided with a control grid, means for applying to said grid a voltage derived from said armature current for controlling the conductivity of said additional valve means, and means responsive to the condition of conductivity of said additional valve means for controlling said first electric valve means to limit the current supplied to said armature to a predetermined value and to weaken the current supplied to said field winding only after said armature current tends to decrease below said predetermined value.

11. A starter for a motor having an armature and a field winding comprising electric valve means for supplying current to said armature and field winding, a control member for said valve means continuously movable through a range of positions to control said valve means to increase the voltage supplied to said armature and through a succeeding range of positions to control said valve means to weaken the current supplied to said field winding, and means responsive to the armature voltage of said motor for controlling said valve means to limit the voltage of said motor to a predetermined value by controlling the excitation of said field winding when said control member is returned from a weakened field position to a strengthened field position.

12. A starter for a motor having an armature and a field winding comprising in combination, means for supplying current to said armature, electric valve means for supplying current to said field winding, said electric valve means being provided with a control grid, means for controlling said electric valve means to weaken the current supplied to said field winding to accelerate said motor comprising an auxiliary electric valve provided with an anode, a cathode, and a control grid, a control member continuously movable through a range of positions and means controlled thereby for varying the grid to cathode voltage of said auxiliary valve, and means for controlling said electric valve means to limit the armature voltage of said motor to a predetermined value when said control member is returned from a weakened field position to a strengthened field position comprising a second auxiliary electric valve provided with an anode, a cathode, and a control grid, and means for supplying to the cathode and grid of said second auxiliary valve a voltage derived from said motor and proportional to the counter-voltage thereof.

13. A starter for an electric motor having an armature and a field winding comprising in combination, means for presetting an operating speed for said motor comprising means for producing a reference voltage corresponding to the desired speed of said motor, means for deriving from said motor a voltage proportional to the terminal voltage, an electric valve provided with an anode, a cathode, and a control grid, electrical connections for applying the difference of said reference voltage and derived voltage to said grid and cathode to control the conductivity of said valve, electric valve means responsive to the condition of conductivity of said valve for supplying a voltage to the armature of said motor dependent upon said voltage difference, and means responsive to the current supplied to said armature for modifying the grid to cathode voltage of said valve thereby to compensate for internal voltage drop of said armature.

14. A starter for an electric motor having an armature and a field winding comprising in combination, means for presetting an operating speed for said motor comprising means for producing a reference voltage corresponding to a desired operating speed of said motor, a first circuit deriving a voltage from the motor proportional to the terminal voltage of said motor, an electric valve provided with an anode, a cathode, and a control grid, electrical connections for applying the difference of said reference voltage and derived voltage to the grid and cathode of said valve to control its conductivity, a source of alternating voltage, electric valve means responsive to the condition of conductivity of said valve for supplying a voltage to said armature dependent on said voltage difference, said electric valve means being provided with an anode, a cathode, and a control grid, supply connections from said source to the anode-cathode circuit of said electric valve means, means comprising a current transformer having its primary winding included in the connections between said source and the anode of said electric valve means and a rectifier in the secondary circuit of said transformer for producing a rectified voltage proportional to the current supplied to said armature, and connections from said secondary circuit to said first circuit for modifying the grid to cathode voltage of said electric valve to control said electric valve means to compensate the voltage supplied to said armature for the internal voltage drop of said armature.

15. In combination, an electric motor, unidirectional electric valve means for controlling the supply of current from a source to the armature of said motor, means for controlling the speed of said motor comprising a device movable through a range of positions corresponding to the speed range of said motor, means responsive to movement of said device from a speed controlling position to a lower speed position for completing a dynamic braking circuit for said motor for rapidly reducing the speed of said motor to a value corresponding to said lower speed position, and means responsive to said lower speed of said motor for interrupting said dynamic braking to provide for continued operation of said motor at said lower speed.

16. In combination, an electric motor, unidirectional electric valve means for controlling the supply of current from a source to said motor, means for varying the speed of said motor throughout a substantial range of values, an electric valve connected to be responsive to a speed reducing operation of said speed control means for controlling the completion of a dynamic braking circuit for said motor to effect a reduction of the speed to a lower value corresponding to the extent of operation of said speed control means and responsive to operation of said motor at said lower value for interrupting said dynamic braking circuit.

ELMO E. MOYER.
ORRIN W. LIVINGSTON.
HENRY H. LEIGH.

CERTIFICATE OF CORRECTION.

Patent No. 2,312,117. February 23, 1943.

ELMO E. MOYER, ET AL.

It is hereby certified that error appears in the printed specification of the above numbered patent requiring correction as follows: Page 3, first column, line 35, for "tubes" read --tube--; and second column, line 73, for "position" read --portion--; page 6, first column, line 53, for "sped" read --speed--; line 55, for "its" read --is--; line 63, for "lever" read --level--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.